(12) United States Patent
Hung

(10) Patent No.: US 9,116,585 B2
(45) Date of Patent: Aug. 25, 2015

(54) CAPACITIVE STYLUS

(71) Applicant: George Hung, New Taipei (TW)

(72) Inventor: George Hung, New Taipei (TW)

(*) Notice: Subject to any disclaimer, the term of this patent is extended or adjusted under 35 U.S.C. 154(b) by 452 days.

(21) Appl. No.: 13/661,256

(22) Filed: Oct. 26, 2012

(65) Prior Publication Data

US 2013/0300720 A1    Nov. 14, 2013

(30) Foreign Application Priority Data

May 10, 2012    (TW) .............................. 101208788 U

(51) Int. Cl.
*G06F 3/044* (2006.01)
*G06F 3/0354* (2013.01)

(52) U.S. Cl.
CPC .............. *G06F 3/044* (2013.01); *G06F 3/0354* (2013.01)

(58) Field of Classification Search
CPC ... G06F 3/0354; G06F 3/03545; G06F 3/044; G06F 3/03546
USPC ................... 345/179; 178/18.06, 19.05, 19.03
See application file for complete search history.

(56) References Cited

U.S. PATENT DOCUMENTS

| | | | |
|---|---|---|---|
| 2005/0078096 A1* | 4/2005 | Fan ............................... | 345/179 |
| 2009/0008162 A1* | 1/2009 | Yang et al. .................. | 178/18.06 |
| 2010/0294574 A1* | 11/2010 | Chen ........................... | 178/19.05 |
| 2011/0261026 A1* | 10/2011 | Kim et al. ..................... | 345/179 |
| 2011/0316815 A1* | 12/2011 | Fang ............................. | 345/179 |
| 2012/0146960 A1* | 6/2012 | Shih et al. ..................... | 345/179 |

FOREIGN PATENT DOCUMENTS

WO    WO 2011096696 A2 *    8/2011

* cited by examiner

*Primary Examiner* — Alexander Eisen
*Assistant Examiner* — Abhishek Sarma
(74) *Attorney, Agent, or Firm* — Rosenberg, Klein & Lee

(57) ABSTRACT

A capacitive stylus includes: a hollow stylus stick; a soft touch member made of conductive plastic or rubber in the form of a hollow housing, the soft touch member having a domed touch end; a connection collar assembled with an end section of the stylus stick, the connection collar and the soft touch member together defining an internal space; a support member disposed in the internal space, the support member being made of a rubber material with hardness greater than that of the soft touch member; and a rest seat assembled with the support member, the support member being spaced from the soft touch member by a gap and formed with a multi-support structure facing the soft touch member. In operation, the soft touch member can keep a proper softness without being over-deformed or collapsed.

15 Claims, 4 Drawing Sheets

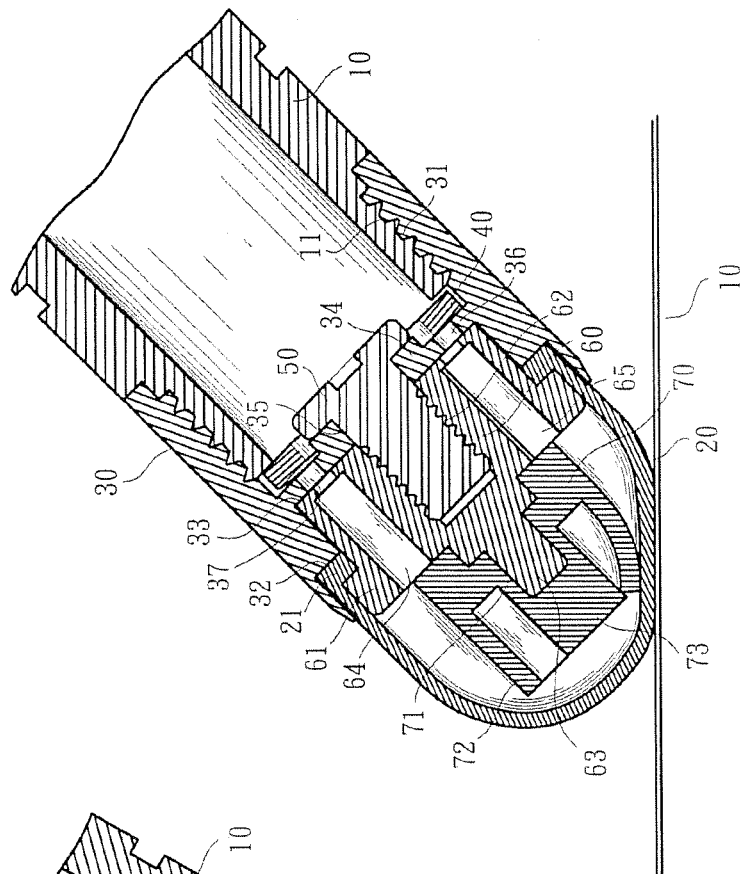
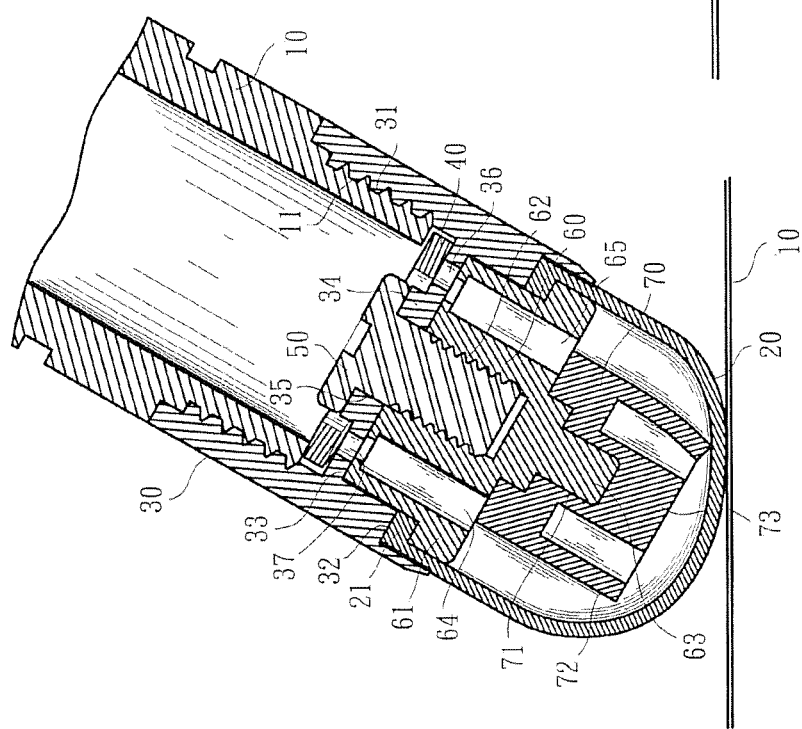
Fig. 6
Fig. 5

CAPACITIVE STYLUS

BACKGROUND OF THE INVENTION

1. Field of the Invention

The present invention relates generally to a capacitive stylus, and more particularly to a capacitive stylus for capacitive touch panel. In operation, the soft touch member of the stylus can keep a proper softness without being over-deformed or collapsed. Also, with the components of the capacitive stylus securely assembled with each other, the capacitive stylus has a good internal operation airflow system.

2. Description of the Related Art

Apple Computer, Inc, is one of the major suppliers of information products. In recent years, Apple Computer, Inc. has released various mobile phones and tablets employing capacitive touch panels. Such touch panel has a graphic operation interface supporting multipoint touch and is popularly accepted in the market. To catch up with the trend, many other manufacturers have also developed and released various information products with capacitive touch panels.

A capacitive touch panel has multiple electrodes uniformly distributed in two directions intersecting each other. When an external grounding conductor such as a finger or a stylus touches the capacitive touch panel, the self capacitance of the touched electrode and the mutual capacitance at the intersection will change. A necessary electrical signal reaction is achieved from the position of the changing electrode or intersection. Therefore, via the static current of the finger or the touch of the stylus, the touch position can be detected and calculated.

The touch operation interface basically is achieved by means of combining the touch panel with the graphic operation interface of the operation system. In operation of the capacitive touch screen, the signal actually flowing through the capacitive touch panel is very weak. Under some operation circumstances, the signal will be shifted due to the size and temperature of the finger or other factors. In this case, it is impossible to precisely and sensitively write a character or draft a graph and it is necessary to use a stylus instead of the finger.

At early stage, the capacitive stylus applied to the capacitive touch screen has a stylus stick made of conductive material with a certain length for conducting static of a user. A soft touch member basically made of conductive plastic or rubber is disposed at an end section of the stylus stick. A nib made of metal material in the form of a straight barrel is disposed in an internal hole of the end section of the stylus stick. The nib partially extends into the soft touch member. In generally, the soft touch member has a domed touch end for increasing contact area between the stylus and the capacitive touch panel and avoiding wear of the panel. The nib in the form of a straight barrel partially extends into the interior of the soft touch member. Under such circumstance, a considerably large gap exists between the nib and the soft touch member without any support. As a result, when a user uses the stylus to touch or slide on the capacitive touch screen, the center of the domed touch end of the soft touch member will be deformed and inward collapsed to an extent. In practice, the collapsed section will contact the capacitive touch screen by an insufficient area so that the sensation is poor. In this case, the touch position can be hardly precisely calculated. This will lead to shift of the touch position.

To overcome the above problem, for example, conventional skill discloses a stylus for capacitive touch screen. The stylus includes a copper column in the form of a straight barrel, which is assembled with an end section of the stylus stick and a soft conductive member disposed at the end section as a direct touch member. A nib is disposed between the copper column and the soft conductive member. The nib basically has a cross section in the form of a triangular pyramid. The nib can fully abut against an inner side of the bottom of the soft conductive member as a support structure for the touch end of the soft conductive member. The nib can avoid collapse of the soft conductive member in use. However, for achieving the necessary support effect, the components of such stylus are nearly totally tightly connected with each other without any internal airflow passage. This will affect the function of the stylus. Moreover, in such stylus, the soft conductive member, the copper column and the nib are not well electrically connected with each other.

SUMMARY OF THE INVENTION

It is therefore a primary object of the present invention to provide a capacitive stylus. In operation, the soft touch member of the stylus can keep a proper softness without being over-deformed to affect its function.

It is a further object of the present invention to provide the above capacitive stylus in which the components of the capacitive stylus are more securely assembled with each other and are in more reliable contact with each other.

It is still a further object of the present invention to provide the above capacitive stylus, which has a good internal operation airflow system.

To achieve the above and other objects, the capacitive stylus of the present invention includes: a hollow stylus stick for a user to hold; a soft touch member made of conductive plastic or rubber in the form of a hollow housing, the soft touch member having a domed touch end; a connection collar assembled with an end section of the stylus stick, the connection collar and the soft touch member together defining an internal space; a support member disposed in the internal space behind an inner side of the soft touch member, the support member being made of a rubber material with hardness greater than that of the soft touch member; and a rest seat assembled with the support member, the support member being spaced from the soft touch member by a gap and formed with a multi-support structure facing the soft touch member. When the soft touch member touches or slides on a capacitive touch panel, the multi-support structure serves to support the soft touch member to limit the deformation thereof.

In the above capacitive stylus, the multi-support structure of the support member at least includes a first support ring and a second central support column spaced from the first support ring. The first support ring and the second central support column are positioned behind an inner side of the domed touch end of the soft touch member.

In the above capacitive stylus, inner circumference of upper end of the connection collar is formed with an inner thread for screwing on an outer thread formed on the end section of the stylus stick. The rest seat is assembled in a lower end of the connection collar. At least one end of the rest seat is formed with an end boss for connecting with the support member. A locating bolt is passed through the connection collar and screwed into the rest seat. The locating bolt abuts against the connection collar to assemble and locate the soft touch member, the rest seat and the support member with the connection collar.

In the above capacitive stylus, inner circumference of lower end of the connection collar is formed with a first stepped section and a diaphragm defining a second stepped section. The rest seat has a main seat body section engaged with the second stepped section of the connection collar. The rest seat further has a flange formed on outer circumference of lower end of the main seat body section corresponding to the first stepped section of the connection collar for locating the soft touch member.

In the above capacitive stylus, the soft touch member is formed with a top flange located between the first stepped section of the connection collar and the flange of the rest seat.

In the above capacitive stylus, the main seat body section of the rest seat is engaged with the second stepped section of the connection collar and the end boss of the rest seat is inserted in a central socket of the support member. The locating bolt is passed through a central hole of the connection collar and screwed into a central threaded hole of the main seat body section of the rest seat to abut against an upper surface of the diaphragm.

In the above capacitive stylus, at least one elastic member is disposed between the end section of the stylus stick and the diaphragm of the connection collar.

In the above capacitive stylus, a gap is defined between the soft touch member and the support member. The rest seat is formed with vents. The connection collar is formed with vents in communication with the vents of the rest seat. The gap between the soft touch member and the support member and the vents of the rest seat and the vents of the connection collar and an interior of the stylus stick together form a complete operation airflow system.

The present invention can be best understood through the following description and accompanying drawings, wherein:

BRIEF DESCRIPTION OF THE DRAWINGS

FIG. 5 is a sectional view showing that the present invention is preliminarily operated; and FIG. 6 is a sectional view according to FIG. 5, showing that the present invention is further operated.

DETAILED DESCRIPTION OF THE PREFERRED EMBODIMENTS

Figure 1:
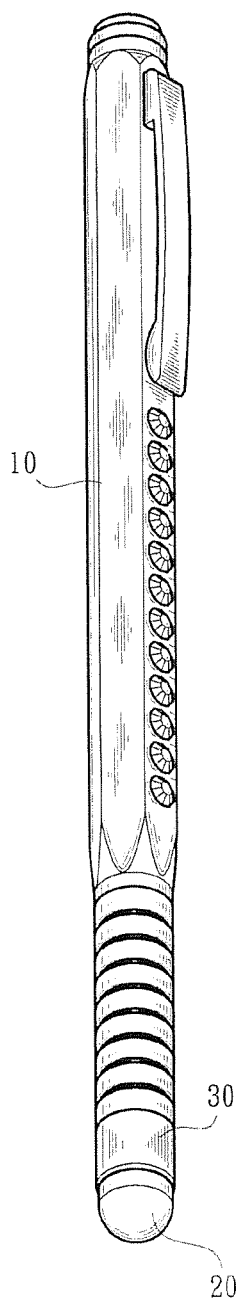
FIG. 1 is a perspective assembled view of a preferred embodiment of the present invention.
Figure 2:
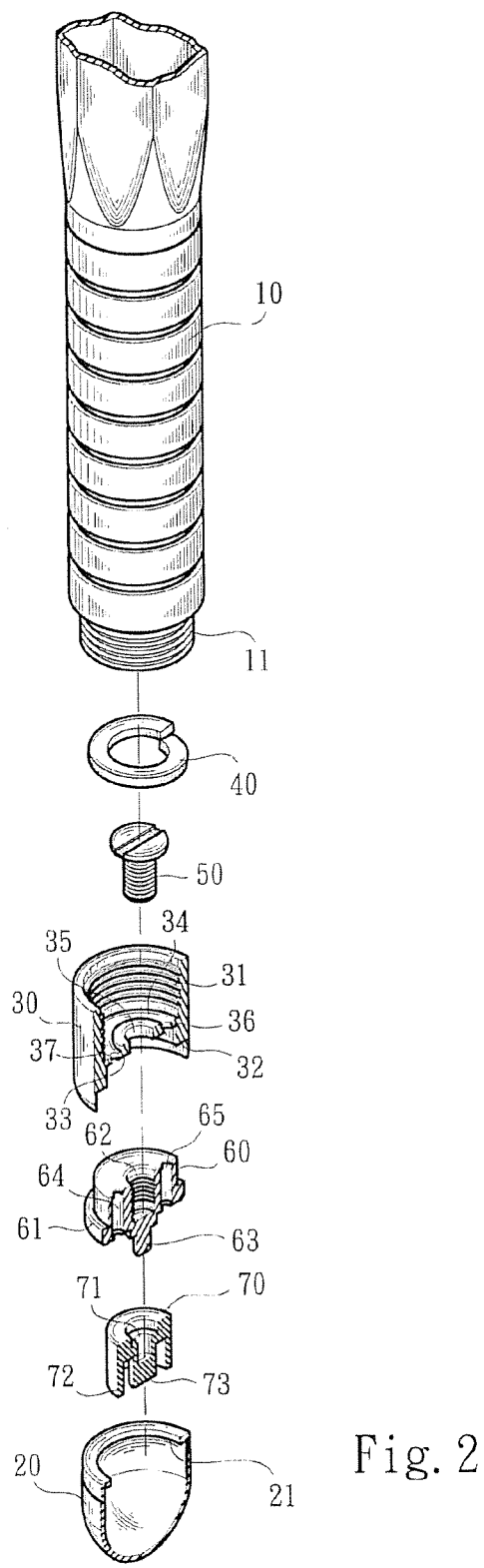
FIG. 2 is a perspective exploded view of the preferred embodiment of the present invention.
Figure 4:
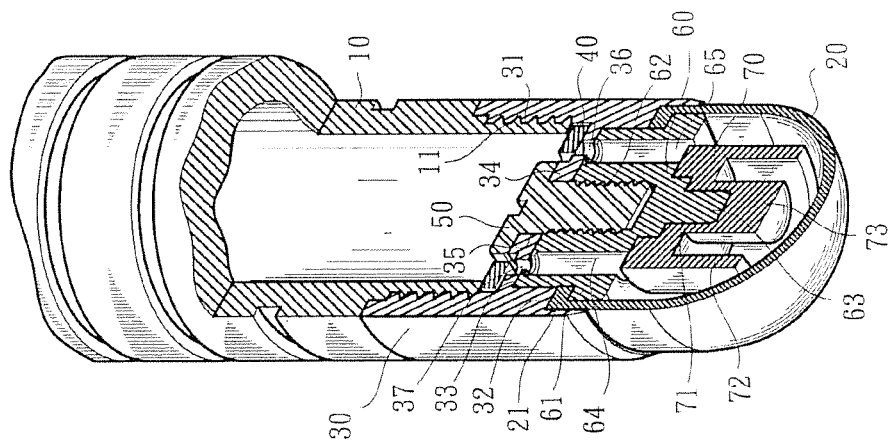
FIG. 4 is a perspective sectional view according to FIG. 3.
Figure 3:
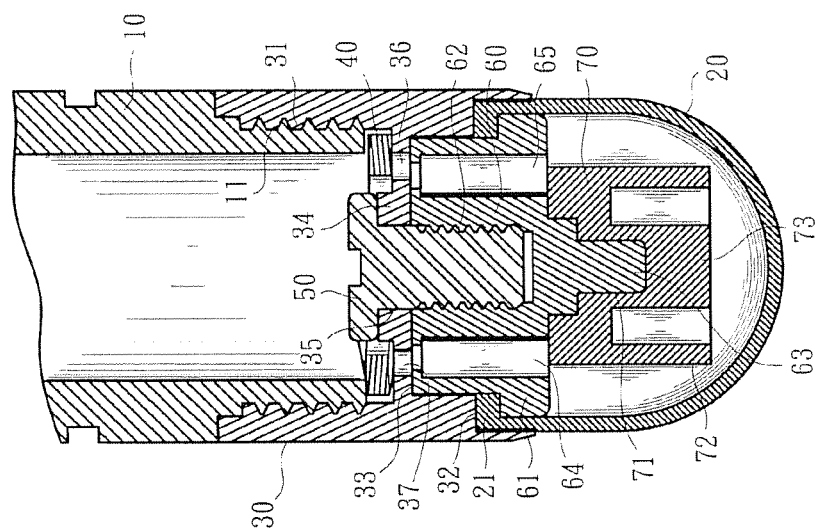
FIG. 3 is an enlarged sectional view of a part of FIG. 1.

Please refer to FIG. 1. The capacitive stylus of the present invention has a hollow stylus stick 10 with a certain length for a user to hold. The stylus stick 10 is made of conductive material for conducting static of the user. A soft touch member 20 basically made of conductive plastic or rubber in the form of a hollow housing is disposed at an end section of the stylus stick 10 for touching or sliding a capacitive touch screen. In order to avoid wear of the panel, in this embodiment, the soft touch member 20 has a domed lower end.

Please now refer to FIGS. 1 to 4. A connection collar 30 is disposed between the stylus stick 10 and the soft touch member 20. Between the connection collar 30 and the soft touch member 20 are sequentially arranged an elastic member 40, a locating bolt 50, a rest seat 60 and a support member 70 from upper side to lower side. The support member 70 forms a multi-support structure.

In this embodiment, inner circumference of upper end of the connection collar 30 is formed with an inner thread 31 for screwing on an outer thread 11 formed on the end section of the stylus stick 10. Inner circumference of lower end of the connection collar 30 is formed with a first stepped section 32 and a diaphragm 34 defining a second stepped section 33. The diaphragm 34 is formed with a central hole 35 and two lateral vents 36, 37.

The rest seat 60 is preferably made of a conductive material such as metal. The rest seat 60 has a main seat body section engaged with the second stepped section 33 of the connection collar 30. The rest seat 60 further has a flange 61 formed on outer circumference of lower end of the main seat body section corresponding to the first stepped section 32 of the connection collar 30 for locating the soft touch member 20. In this embodiment, the soft touch member 20 is formed with a top flange 21 located between the first stepped section 32 of the connection collar 30 and the flange 61 of the rest seat 60. The main seat body section of the rest seat 60 is formed with a central threaded hole 62 with a predetermined depth and an end boss 63 coaxial with the threaded hole 62. In addition, the main seat body section is formed with lateral vents 64, 65 on two sides of the threaded hole 62 and the end boss 63. The vents 64, 65 pass through the entire main seat body section of the rest seat 60. In this embodiment, an upper end of each of the vents 64, 65 is formed with a small-diameter perforation for creating pressure difference. The through holes are aligned with the lateral vents 36, 37 of the connection collar 30 in communication with the lateral vents 36, 37.

The support member 70 is assembled with an end section of the rest seat 60 and positioned behind an inner side of the domed touch end of the soft touch member 20. The support member 70 is preferably made of a rubber material with hardness greater than that of the soft touch member 20. In this embodiment, the support member 70 is formed with a central socket 71 with a certain depth for inserting the end boss 63 of the rest seat 60 therein. The other end (lower end according to the drawings) of the support member 70 is formed with a multi-support structure. In this embodiment, the multi-support structure preferably includes a first support ring 72 and a second central support column 73 spaced from each other. The first support ring 72 and the second central support column 73 are positioned behind the inner side of the domed touch end of the soft touch member 20. The support member 70 has a width, (that is, a diameter), slightly smaller than the distance between the vents 64, 65 to form a necessary airflow passage.

The top flange 21 of the soft touch member 20 is located between the first stepped section 32 of the connection collar 30 and the flange 61 of the rest seat 60. The main seat body section of the rest seat 60 is engaged with the second stepped section 33 of the connection collar 30. The end boss 63 of the rest seat 60 is inserted in the central socket 71 of the support member 70. The locating bolt 50 is passed through the central hole 35 of the connection collar 30 and screwed into the central threaded hole 62 of the main seat body section of the rest seat 60. Under such circumstance, the locating bolt 50 abuts against an upper surface of the diaphragm 34 to assemble and locate the soft touch member 20, the rest seat 60 and the support member 70 with the connection collar 30. Then, the outer thread 11 of the stylus stick 10 is screwed into the corresponding inner thread 31 of the connection collar 30 to complete the assembling process. In this embodiment, the elastic member 40 is disposed between the end section of the stylus stick 10 and the diaphragm 34 of the connection collar 30 so as to more securely elastically assemble the components with each other. In this embodiment, the elastic member 40 is an elastic gasket.

After assembled, the support member 70 is positioned behind the inner side of the soft touch member 20 for touching and sliding on the capacitive touch screen. The support member 70 is spaced from the soft touch member 20 by a certain gap. The support member 70 is assembled with the end section of the rest seat 60. The locating bolt 50 and the cooperative elastic member 40 serve to elastically assemble and lock the stylus stick 10 with the connection collar 30. In addition, through the vents 64, 65 of the rest seat 60 and the vents 36, 37 of the connection collar 30 and the interior of the stylus stick 10, a complete operation airflow system is formed between the soft touch member 20 and the support member 70 and between the support member 70 and the rest seat 60.

As shown in FIG. 5, when the soft touch member 20 of the capacitive stylus touches or slides on the capacitive touch panel 100, the soft touch member 20 is forcedly partially deformed and first pressed against the first support ring 72 of the multi-support structure of the support member 70. The harder first support ring 72 is forced and gradually biased inward. When the soft touch member 20 is further forced as shown in FIG. 6, the first support ring 72 is pressed against the second central support column 73 of the multi-support structure, whereby the entire multi-support structure bears the force. In this case, the maximum deformation of the soft touch member 20 is limited so as to prevent the soft touch member 20 from totally collapsing to lose its function. Moreover, in the operation, the internal air can freely flow within the operation airflow system to achieve a good flowing effect.

In conclusion, the soft touch member of the capacitive stylus of the present invention can keep a proper softness in operation without collapsing to lose its function. Also, with the components of the capacitive stylus securely assembled in reliable contact with each other, the capacitive stylus has a good operation airflow system.

The above embodiments are only used to illustrate the present invention, not intended to limit the scope thereof. Many modifications of the above embodiments can be made without departing from the spirit of the present invention.

What is claimed is:

1. A capacitive stylus for capacitive touch panel, the capacitive stylus comprising: a hollow stylus stick for a user to hold; a soft touch member made of conductive plastic or rubber in the form of a hollow housing, the soft touch member having a domed touch end; a connection collar assembled with an end section of the stylus stick, the connection collar and the soft touch member together defining an internal space; a support member disposed in the internal space behind an inner side of the soft touch member, the support member being made of a rubber material with hardness greater than that of the soft touch member; and a rest seat assembled with the support member, the support member being spaced from the soft touch member by a gap and formed with a multi-support structure facing the soft touch member, a gap being defined between the soft touch member and the support member, the rest seat being formed with vents, the connection collar being formed with vents in communication with the vents of the rest seat, whereby the gap between the soft touch member and the support member and the vents of the rest seat and the vents of the connection collar and an interior of the stylus stick together form a complete operation airflow system.

2. The capacitive stylus as claimed in claim 1, wherein the multi-support structure of the support member at least includes a first support ring and a second central support column spaced from the first support ring, the first support ring and the second central support column being positioned behind an inner side of the domed touch end of the soft touch member.

3. The capacitive stylus as claimed in claim 1, wherein an inner circumference of an upper end of the connection collar is formed with an inner thread for screwing on an outer thread formed on the end section of the stylus stick, the rest seat being assembled in a lower end of the connection collar, at least one end of the rest seat being formed with an end boss for connecting with the support member, a locating bolt being passed through the connection collar and screwed into the rest seat, whereby the locating bolt abuts against the connection collar to assemble and locate the soft touch member, the rest seat and the support member with the connection collar.

4. The capacitive stylus as claimed in claim 2, wherein an inner circumference of an upper end of the connection collar is formed with an inner thread for screwing on an outer thread formed on the end section of the stylus stick, the rest seat being assembled in a lower end of the connection collar, at least one end of the rest seat being formed with an end boss for connecting with the support member, a locating bolt being passed through the connection collar and screwed into the rest seat, whereby the locating bolt abuts against the connection collar to assemble and locate the soft touch member, the rest seat and the support member with the connection collar.

5. The capacitive stylus as claimed in claim 3, wherein an inner circumference of a lower end of the connection collar is formed with a first stepped section and a diaphragm defining a second stepped section, the rest seat having a main seat body section engaged with the second stepped section of the connection collar, the rest seat further having a flange formed on outer circumference of lower end of the main seat body section corresponding to the first stepped section of the connection collar for locating the soft touch member.

6. The capacitive stylus as claimed in claim 4, wherein an inner circumference of a lower end of the connection collar is formed with a first stepped section and a diaphragm defining a second stepped section, the rest seat having a main seat body section engaged with the second stepped section of the connection collar, the rest seat further having a flange formed on outer circumference of lower end of the main seat body section corresponding to the first stepped section of the connection collar for locating the soft touch member.

7. The capacitive stylus as claimed in claim 5, wherein the soft touch member is formed with a top flange located between the first stepped section of the connection collar and the flange of the rest seat.

8. The capacitive stylus as claimed in claim 6, wherein the soft touch member is formed with a top flange located between the first stepped section of the connection collar and the flange of the rest seat.

9. The capacitive stylus as claimed in claim 7, wherein the main seat body section of the rest seat is engaged with the second stepped section of the connection collar and the end boss of the rest seat is inserted in a central socket of the support member, the locating bolt being passed through a central hole of the connection collar and screwed into a central threaded hole of the main seat body section of the rest seat to abut against an upper surface of the diaphragm.

10. The capacitive stylus as claimed in claim 8, wherein the main seat body section of the rest seat is engaged with the second stepped section of the connection collar and the end boss of the rest seat is inserted in a central socket of the support member, the locating bolt being passed through a central hole of the connection collar and screwed into a central threaded hole of the main seat body section of the rest seat to abut against an upper surface of the diaphragm.

11. The capacitive stylus as claimed in claim 3, wherein at least one elastic member is disposed between the end section of the stylus stick and the diaphragm of the connection collar.

12. The capacitive stylus as claimed in claim 4, wherein at least one elastic member is disposed between the end section of the stylus stick and the diaphragm of the connection collar.

13. A capacitive stylus for capacitive touch panel, the capacitive stylus comprising: a hollow stylus stick for a user to hold; a soft touch member made of conductive plastic or rubber in the form of a hollow housing, the soft touch member having a domed touch end; a connection collar assembled with an end section of the stylus stick, the connection collar and the soft touch member together defining an internal space, an inner circumference of an upper end of the connection collar being formed with an inner thread for screwing on an outer thread formed on the end section of the stylus stick an inner circumference of a lower end of the connection collar being formed with a first stepped section and a diaphragm defining a second stepped section; a support member disposed in the internal space behind an inner side of the soft touch member, the support member being made of a rubber material with hardness greater than that of the soft touch member; and a rest seat assembled with the support member, the support member being spaced from the soft touch member by a gap and formed with a multi-support structure facing the soft touch member, the rest seat being assembled in a lower end of the connection collar, at least one end of the rest seat being formed with an end boss for connecting with the support member, a locating bolt being passed through the connection collar and screwed into the rest seat, whereby the locating bolt abuts against the connection collar to assemble and locate the soft touch member, the rest seat and the support member with the connection collar, the rest seat having a main seat body section engaged with the second stepped section of the connection collar, the rest seat further having a flange formed on outer circumference of lower end of the main seat body section corresponding to the first stepped section of the connection collar for locating the soft touch member.

14. The capacitive stylus as claimed in claim 13, wherein the soft touch member is formed with a top flange located between the first stepped section of the connection collar and the flange of the rest seat.

15. The capacitive stylus as claimed in claim 13, wherein at least one elastic member is disposed between the end section of the stylus stick and the diaphragm of the connection collar.

* * * * *